United States Patent
Kastner

(10) Patent No.: US 8,992,357 B2
(45) Date of Patent: Mar. 31, 2015

(54) SEGMENTED RECEIVING HOUSING HOLE, SLIDING CORE, TENSIONING DEVICE AND TRACTION MECHANISM DRIVE

(75) Inventor: Michael Kastner, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 289 days.

(21) Appl. No.: 13/489,636

(22) Filed: Jun. 6, 2012

(65) Prior Publication Data

US 2012/0322595 A1 Dec. 20, 2012

(30) Foreign Application Priority Data

Jun. 17, 2011 (DE) .......................... 10 2011 077 740

(51) Int. Cl.

| | |
|---|---|
| *F16H 7/22* | (2006.01) |
| *B22D 29/00* | (2006.01) |
| *B22D 11/128* | (2006.01) |
| *F16H 7/08* | (2006.01) |

(52) U.S. Cl.
CPC .......... *F16H 7/08* (2013.01); *F16H 2007/0806* (2013.01); *F16H 2007/0812* (2013.01)
USPC ........... 474/110; 164/132; 164/344; 29/527.6

(58) Field of Classification Search
CPC .............. F16H 7/08; F16H 2007/0806; F16H 2007/0812
USPC .......... 474/110, 111; 164/131, 132, 344, 345; 29/527.5, 527.6
See application file for complete search history.

(56) References Cited

U.S. PATENT DOCUMENTS

| | | | | |
|---|---|---|---|---|
| 1,535,330 | A | * | 4/1925 | Mills .............................. 138/177 |
| 2,085,212 | A | * | 6/1937 | Dornin .......................... 164/406 |
| 2,323,972 | A | * | 7/1943 | Brauchler ..................... 29/527.6 |
| 4,743,224 | A | * | 5/1988 | Yoshikawa et al. ........... 474/101 |
| 4,838,840 | A | * | 6/1989 | Mutoh et al. .................. 474/138 |
| 5,137,074 | A | * | 8/1992 | Gonzalez ........................ 164/98 |
| 6,053,831 | A | * | 4/2000 | Boedo ............................ 474/109 |
| 2004/0147349 | A1 | * | 7/2004 | Markley et al. ............... 474/109 |
| 2008/0274289 | A1 | * | 11/2008 | Sakurai et al. ................ 427/327 |
| 2009/0011880 | A1 | * | 1/2009 | Sato et al. ...................... 474/111 |
| 2009/0313805 | A1 | * | 12/2009 | McPhail et al. .............. 29/527.5 |

FOREIGN PATENT DOCUMENTS

| | | |
|---|---|---|
| DE | 102008033260 | 1/2010 |
| DE | 102010045874 | 4/2011 |

* cited by examiner

*Primary Examiner* — William E Dondero
*Assistant Examiner* — Minh Truong
(74) *Attorney, Agent, or Firm* — Volpe and Koenig, P.C.

(57) ABSTRACT

A receiving housing of a hydraulic tensioning device for a traction mechanism drive in an internal combustion engine, having an opening that extends along a longitudinal axis for receiving a piston that is implemented for deflecting a tensioning rail of the traction mechanism drive. The receiving housing is a cast component, and the opening comprises an inner contour having an inner surface that comprises at least first segments and inclines for removing the workpiece from the mold in the opening. The second segments include surfaces that are directed into the inside of the opening and are aligned in parallel with the longitudinal axis. A sliding core is also provided that has an outer contour that is complementary to the inner contour of the opening of the receiving housing and fits into the opening. A traction mechanism drive and tensioning device having a receiving housing of this type are also included.

9 Claims, 3 Drawing Sheets

SEGMENTED RECEIVING HOUSING HOLE, SLIDING CORE, TENSIONING DEVICE AND TRACTION MECHANISM DRIVE

CROSS-REFERENCE TO RELATED APPLICATIONS

This application claims the benefit of German Patent Application No. 102011077740.7, filed Jun. 17, 2011, which is incorporated herein by reference as if fully set forth.

FIELD OF THE INVENTION

The invention relates to a receiving housing of a hydraulic tensioning device for a traction mechanism drive in an internal combustion engine, having an opening that extends along a longitudinal axis for receiving a piston that is actuated for deflecting a tensioning rail of the traction mechanism drive, wherein the receiving housing that surrounds the opening is a cast component, wherein moreover the opening comprises an inner contour having an inner surface that comprises at least first segments, and inclines for removing the workpiece from the mold are provided in the opening.

Receiving housings of this type are used in traction mechanism drive, in which a traction mechanism, such as a chain or a belt, is deflected by a tensioning device that acts on a tensioning rail. The tensioning device is embodied in such a manner that it can push a piston out of an opening by hydraulic action.

Here, the opening receives a piston.

Traction mechanism drives of this type are used in internal combustion engines, in particular in motor vehicles. Traction mechanism drives of this type are in use in particular in the area of timing assemblies. The traction mechanism transmits the torque of a crank shaft to a cam shaft and/or shafts of ancillary units.

Tensioning devices are available that use the mechanical action method, whilst others use the hydraulic action method. In the case of hydraulic tensioning devices, a receiving housing is generally provided, out of which a piston is pushed as a result of a hydraulically provided force.

Traction mechanism drives of this type are known for example from DE 10 2010 045 874 A1. Hydraulic tensioning devices are also known from DE 10 2008 033 260 A1. A hydraulic tensioning element is disclosed that is used in tensioning systems of traction mechanism drives, in particular chain drives in internal combustion engines, with this hydraulic tensioning element comprising a tensioning device housing with a blind hole that comprises on a side facing a traction mechanism an opening and on an opposite-lying side a base that comprises a through-going opening with a small diameter, wherein a pressure-loaded piston arranged in an axially displaceable manner and a hollow cylinder inserted in the piston are arranged inside the blind hole, wherein a device for securing purposes during transportation can be arranged between the tensioning device housing and piston. This tensioning element is characterized in that an oil discharge opening is arranged in the tensioning device housing to receive a pin for securing purposes during transportation, which opening is disposed at a shorter distance with respect to the base than with respect to the opening of the blind hole.

Hydraulic tensioning devices of this type having a receiving housing are used in the case of chain drive systems and belt drive systems for tensioning a traction mechanism in internal combustion engines.

Due to the presence of inclines that are provided for removing the workpiece from the mold and are necessary during the manufacturing process, it has hitherto been necessary to subject the opening of the receiving housing to further machining. This leads to increased costs. There is also an additional opportunity for error, possibly if machined and non-machined housings are unintentionally interchanged.

SUMMARY

The object of the present invention is to prevent the previously known disadvantages and to offer an improvement, in which the receiving housing as far as possible does not require further machining.

This object is achieved in accordance with one or more aspects of the invention. In one embodiment, the two segments comprise surfaces that are directed into the inside of the opening and are aligned in parallel with the longitudinal axis.

So-called function-important and so-called function-unimportant segments are thus provided. The function-important segments are defined with respect to their relevant property as being important for removing a sliding core from the mold, namely during the primary shaping of a receiving housing. The function-unimportant segments, however, have an important function when guiding the piston.

In the case of an embodiment in accordance with the invention, a shape is achieved whereby the receiving bore is constructed such that this is subdivided into segments, which have primary function-important segments for removing the workpiece from the mold without or with extremely small inclines for removing the workpiece from the mold and secondary, function-unimportant segments that are of no importance as far as the function for removing the workpiece from the mold is concerned but are relevant for guiding the piston are provided.

The advantages are particularly evident when the receiving housing is cast from a metal material, such as aluminum or steel, or injection molded from a synthetic material. As the material sets, it shrinks in the region of the opening, which can also be described as a receiving bore, onto a core, such as a sliding core, contained therein. When removing the workpiece from the mold, it is necessary to remove the core from the component, i.e. from the receiving housing. In order to facilitate the removal of the workpiece from the mold, it is necessary to provide an incline for removing the workpiece from the mold, preferably a plurality of inclines for removing the workpiece from the mold, on the sliding core on one hand and on the inside of the opening on the other hand. This/these incline(s) for removing the workpiece from the mold prevent the hydraulic element, which is mostly embodied on the piston, from being received. It is therefore generally necessary to perform further machining, but this can be omitted in the case of the embodiment in accordance with the invention. In the case of an embodiment in accordance with the invention, the opening created for the piston does not require further machining.

Advantageous embodiments are described in detail below and in the claims.

It is thus of advantage if the opening is embodied as a substantially cylindrical hole, approximately in the manner of a blind hole. A region can then be provided, into which hydraulic medium can flow and, provided that it is subjected to pressure, push out a piston inserted into the opening.

It is also of advantage if the first segments comprise surfaces that are directed into the inside of the opening, are arranged in an inclined manner with respect to the longitudinal axis and form the inclines for removing the workpiece from the mold. These inclines for removing the workpiece from the mold comprise a gradient of from 1 to 10° with respect to the longitudinal axis of the hole.

Moreover, it is of advantage if the first segments and/or second segments extend longitudinally from an outer edge of the hole as far as a closed base of the hole. As a consequence, on the one hand the sliding core can be removed easily from the mold, whereas on the other hand it is ensured that the piston is guided in an appropriate manner during operation in the traction mechanism drive.

It is thus also of advantage if the radial extent of a first segment is greater than the radial extent of a second segment, preferably twice as large, three times as large or four times as large. In this manner, a particularly favorable balance of forces is achieved.

It is also of advantage if eight first segments and/or eight second segments are provided, the reason being that as a consequence the sliding core can be easily removed from the mold in an effective manner.

A further exemplary embodiment is characterized in that the first segments are arranged alternately with the second segments along the periphery of the opening. In other words, a first segment follows a second segment that in turn is followed by a first segment as seen in the direction of the periphery of the opening.

The invention relates also to a sliding core that comprises an outer contour that is complementary to the inner contour of the opening of the receiving housing in accordance with the invention and fits into the opening.

Moreover, the invention relates to a tensioning device having a receiving housing in accordance with the invention and a piston that fits into the opening. It also comprises a traction mechanism drive having a tensioning device in accordance with the invention, which tensioning device is supported on a tensioning rail of the traction mechanism drive.

BRIEF DESCRIPTION OF THE DRAWINGS

The invention is described in detail with reference to a drawing. Details of a first exemplary embodiment are provided with the aid of five figures, in which.

DETAILED DESCRIPTION OF THE PREFERRED EMBODIMENTS

Figure 2:
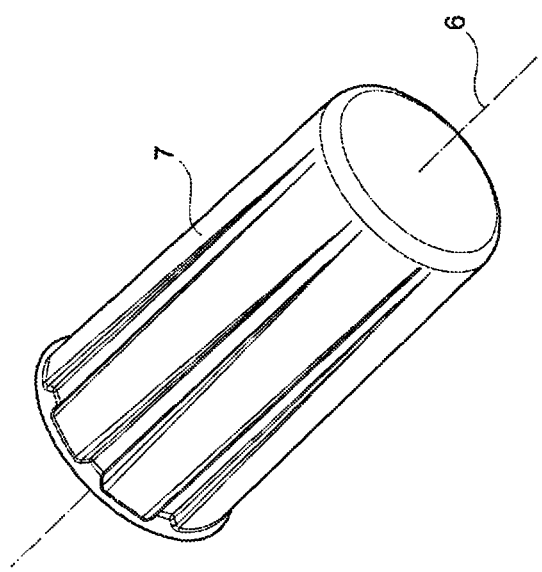
FIG. 2 shows a perspective illustration of a sliding core.

The figures are merely of a schematic nature and serve only to facilitate the understanding of the invention. Like elements are provided with like reference numerals throughout.

Figure 1:
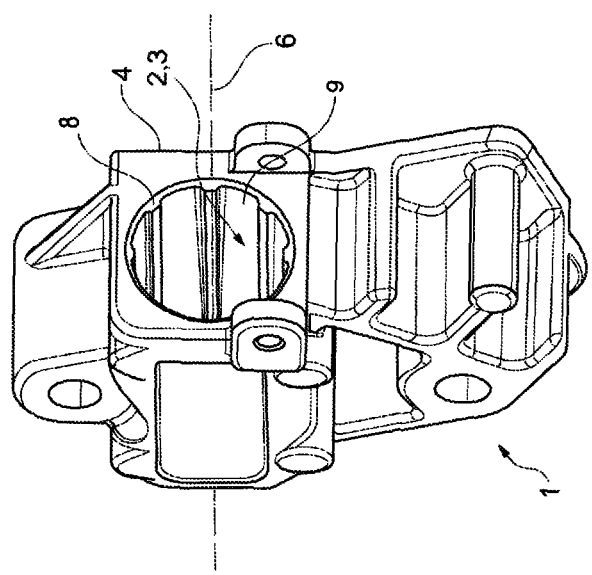
FIG. 1 shows a perspective view of a receiving housing in accordance with the invention, where the sliding core and piston are not inserted.

FIG. 1 illustrates a first embodiment of a receiving housing 1 in accordance with the invention. The receiving housing 1 comprises an opening 2 that is embodied as a hole 3 in the manner of a blind hole.

Figure 3:
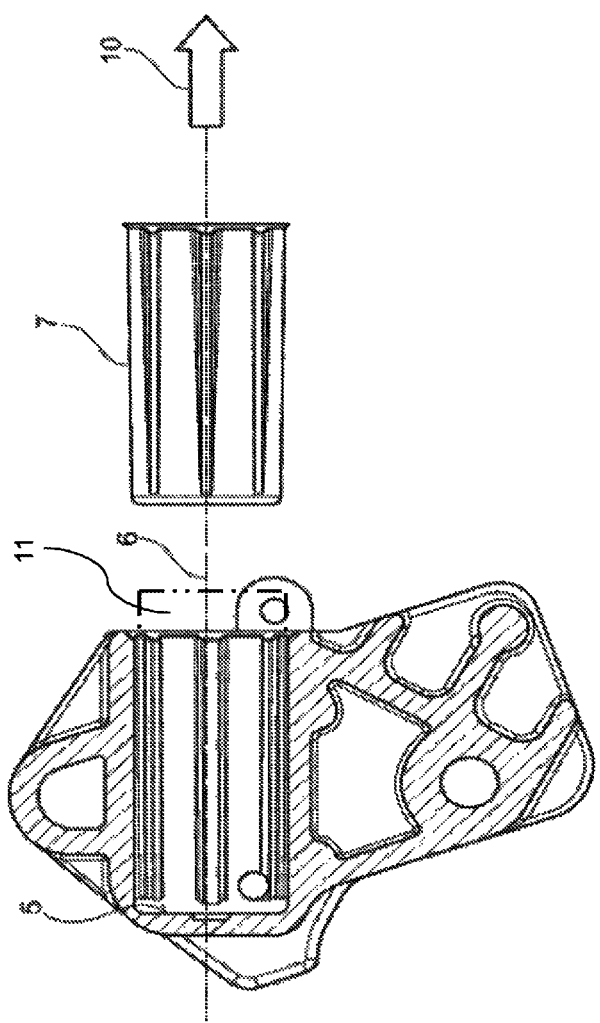
FIG. 3 shows a partial sectional illustration of a receiving housing in accordance with the invention and the sliding core that has been removed is illustrated to the side thereof.

The receiving housing 1 is a single component made from a single material, for example a synthetic material or metal. In the case of the present exemplary embodiment, the receiving housing 1 is manufactured from a light metal, namely an aluminum alloy. The opening 2 comprises an outer edge 4 that is arranged on the other side of a base 5 of the hole. The base 5 of the hole 3, or rather the hole base, is illustrated in FIG. 3.

Figure 5:
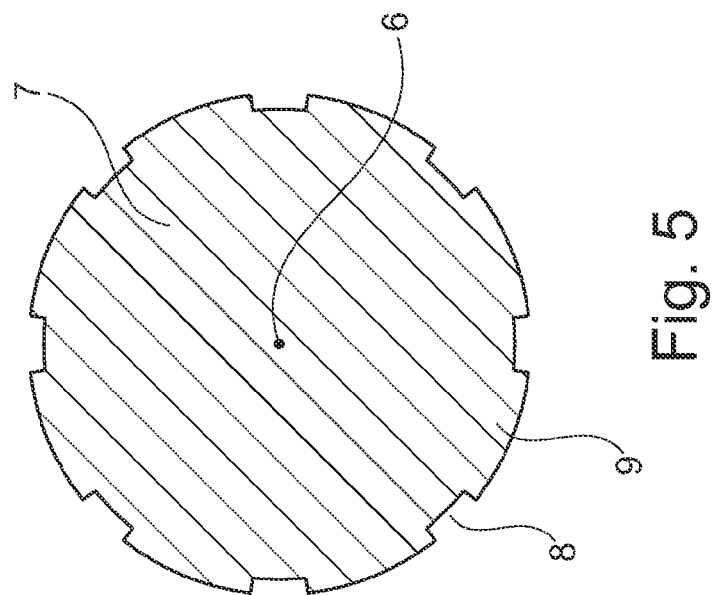
FIG. 5 shows a sectional view through the sliding core along the line V from FIG. 4.
Figure 4:
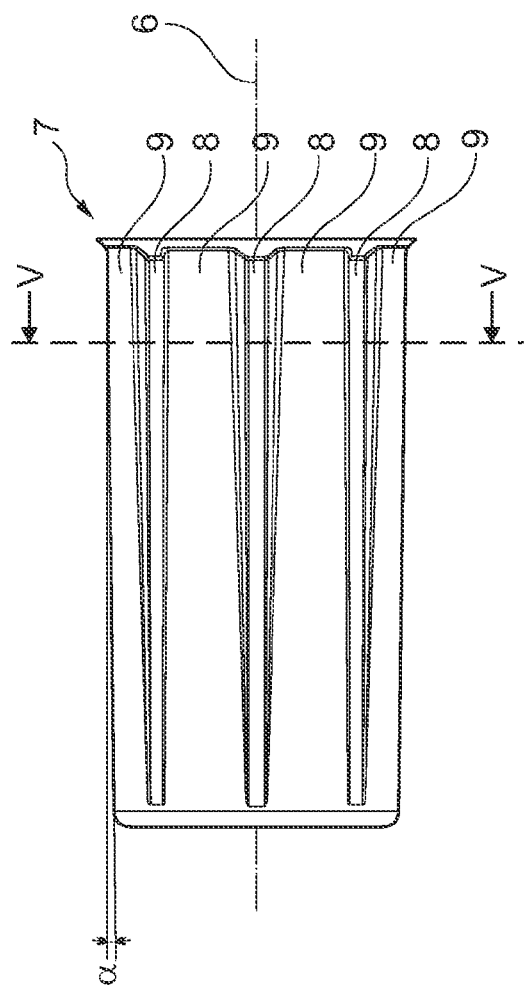
FIG. 4 shows a separate illustration of the sliding core as viewed from above.

The hole 3 extends along a longitudinal axis 6 of the receiving housing 1. The longitudinal axis 6 is simultaneously also the longitudinal axis 6 of a slide 7 that is inserted into the hole 3, as illustrated in FIGS. 2, 3 and 4. The longitudinal axis 6 is also indicated in FIG. 5.

The opening 2 comprises an inner contour that is subdivided into first segments 8 and second segments 9. The first segments 8 comprise inwardly directed surfaces that are arranged in an inclined manner with respect to the longitudinal axis 6. The second segments 9 comprise inner surfaces that are arranged directed inwards and extend in parallel with the longitudinal axis 6. The first segments 8 and the second segments 9 extend from the edge 4 as far as the base 5 of the hole 3.

FIG. 2 illustrates a slide 7 that is also described as a sliding core 7, wherein the outer contour of the sliding core 7 is complementary to the inner contour of the hole 3.

The sliding core 7 is used during the casting and/or injection molding method when manufacturing the receiving housing 1. Upon completion of the casting or injection molding method, the sliding core 7 is removed in a direction 10 of removal from the mold, as illustrated in FIG. 3. FIG. 3 also shows the piston 11 (in phantom lines) arranged in the opening 2 of the receiving housing 1.

As is particularly clearly evident in FIGS. 4 and 5, the first segments 8 are arranged alternately with the second segments 9 as seen over the periphery of the slide 7. The first segments 8 are aligned in parallel with the second segments 9. The first segments 8 comprise a surface that includes an angle α relative to the longitudinal axis 6. The angle α is a value between 1° and 10°, preferably 3° to 7°.

The second segments 9 are arranged between the first segments 8.

LIST OF REFERENCE NUMERALS

1 Receiving housing
2 Openings
3 Hole
4 Edge
5 Base
6 Longitudinal axes
7 Slide/Sliding core
8 First segments
9 Second segments
10 Direction of removal from the mold

The invention claimed is:

1. A receiving housing of a hydraulic tensioning device for a traction mechanism drive in an internal combustion engine, comprising an opening defined therein that extends along a longitudinal axis for receiving a piston that is implemented for deflecting a tensioning rail of the traction mechanism drive, the receiving housing that surrounds the opening is a cast component, and the opening comprises an inner contour having an inner surface that comprises at least first segments that are inclined for a majority of the opening along the longitudinal axis for removing a core from the receiving housing are provided in the opening, and second segments that comprise surfaces that are directed into an inside of the opening and are aligned in parallel with the longitudinal axis.

2. The receiving housing according to claim 1, wherein the opening is a substantially cylindrical blind hole.

3. The receiving housing according to claim 1, wherein the first segments comprise surfaces that are directed into the inside of the opening, are arranged in an inclined manner with respect to the longitudinal axis and form inclines for removing the core from the receiving housing.

4. The receiving housing according to claim 3, wherein at least one of the first segments or the second segments extend longitudinally from an outer edge of the hole as far as a substantially closed base of the hole.

5. The receiving housing according to claim 1, wherein a radial extent of one of the first segments is greater than a radial extent of one of the second segments.

6. The receiving housing according to claim 1, wherein the radial extent of one of the first segments is two times greater than the radial extent of one of the second segments.

7. The receiving housing according to claim 1, wherein there are eight of the first segments and eight of the second segments.

8. The receiving housing according to claim 1, wherein the first segments are arranged alternately with the second segments along a periphery of the opening.

9. A tensioning device comprising a receiving housing including an opening defined therein that extends along a longitudinal axis for receiving a piston that is implemented for deflecting a tensioning rail of the traction mechanism drive, the receiving housing that surrounds the opening is a cast component, and the opening comprises an inner contour having an inner surface that comprises at least first segments that are inclined for a majority of the opening along the longitudinal axis for removing a core from the receiving housing are provided in the opening, and second segments that comprise surfaces that are directed into an inside of the opening and are aligned in parallel with the longitudinal axis, and a piston that fits into the opening.

* * * * *